US 8,225,584 B2

(12) United States Patent
Weisinger et al.

(10) Patent No.: US 8,225,584 B2
(45) Date of Patent: Jul. 24, 2012

(54) FILM FOR STRETCH HOOD APPLICATIONS AND METHOD FOR USING SAME

(75) Inventors: David R. Weisinger, Houston, TX (US); Willy J. J. Leysen, Meerhout (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 369 days.

(21) Appl. No.: 12/545,626

(22) Filed: Aug. 21, 2009

(65) Prior Publication Data

US 2011/0041460 A1    Feb. 24, 2011

(51) Int. Cl.
*B65B 53/00* (2006.01)
*B32B 27/08* (2006.01)

(52) U.S. Cl. .......................... 53/441; 428/516
(58) Field of Classification Search .............. 53/441, 53/459, 556, 567, 577, 576, 397, 449; 428/515, 428/516, 520, 910
See application file for complete search history.

(56) References Cited

U.S. PATENT DOCUMENTS

| 4,473,990 | A | * | 10/1984 | Thimon ........................ 53/567 |
| 4,603,174 | A | * | 7/1986 | Okada et al. ................. 525/240 |
| 5,248,547 | A | * | 9/1993 | Wilson ......................... 428/218 |
| 5,789,029 | A | * | 8/1998 | Ramsey et al. .............. 428/516 |
| 5,840,430 | A | * | 11/1998 | Ramsey et al. .............. 428/516 |
| 6,032,439 | A | * | 3/2000 | Birkenfeld et al. ............ 53/441 |
| 6,093,480 | A | * | 7/2000 | Eichbauer ................... 428/213 |
| 6,470,654 | B1 | * | 10/2002 | Lachenmeier et al. ......... 53/567 |
| 7,234,289 | B2 | * | 6/2007 | Hannen et al. ................. 53/441 |
| 7,411,026 | B2 | | 8/2008 | Ohlsson et al. |
| 7,923,119 | B2 | * | 4/2011 | Suzuki et al. ................ 428/500 |
| 7,966,790 | B2 | * | 6/2011 | Michels et al. ................ 53/556 |
| 2002/0050124 | A1 | * | 5/2002 | Jaeger ............................ 53/441 |
| 2005/0037219 | A1 | * | 2/2005 | Ohlsson et al. .............. 428/500 |
| 2006/0040075 | A1 | * | 2/2006 | Roulin et al. ................ 428/34.9 |
| 2006/0074192 | A1 | * | 4/2006 | Roulin et al. ................. 525/222 |
| 2007/0092748 | A1 | * | 4/2007 | Suzuki et al. ................ 428/500 |
| 2008/0226920 | A1 | * | 9/2008 | Parkinson et al. ......... 428/411.1 |
| 2009/0317614 | A1 | * | 12/2009 | Nilsen et al. ................. 428/219 |
| 2011/0185683 | A1 | * | 8/2011 | Domenech et al. ............ 53/461 |

FOREIGN PATENT DOCUMENTS

| WO | WO 2005/014672 | 2/2005 |
| WO | WO 2006/076917 | 7/2006 |
| WO | WO 2007/044544 | 4/2007 |

OTHER PUBLICATIONS

U.S. Appl. No. 11/639,789, filed Dec. 15, 2006, Entitled "*Films Incorporating Polymeric Material Combinations, Articles Made Therefrom, and Methods of Making Such Films and Articles*".

* cited by examiner

*Primary Examiner* — Paul R Durand
(74) *Attorney, Agent, or Firm* — Kristina M. Leavitt; Robert L. Abdon; Jamie L. Sullivan

(57) ABSTRACT

Provided are films wherein at least one layer of the film comprises a first polymer component and a second polymer component. The first polymer component comprises propylene-derived units and ethylene-derived units and/or a C4 to C20 alpha-olefin. The second polymer component comprises ethylene-derived units and a units derived from a co-polymerizable ethylenically unsaturated ester. The films are particularly useful in stretch hood applications.

20 Claims, No Drawings

FILM FOR STRETCH HOOD APPLICATIONS AND METHOD FOR USING SAME

FIELD OF THE INVENTION

This disclosure relates to films for stretch hood applications. More particularly, this disclosure relates to films for stretch hood applications comprising propylene-derived units and interpolymers of ethylene and a co-polymerizable ester.

BACKGROUND OF THE INVENTION

Stretch hood packaging systems use a tubular film to bundle and protect goods. The goods may be a single item, such as a washing machine or refrigerator, or a collection of items, such as bottles, bags of soil, bags of polymer pellets, or concrete blocks. Often the goods are supported on a pallet or other supporting platform to form a palletized load which can be easily handled and transported with a forklift. A stretching device stretches the tubular film around the item or items to be packaged forming the stretch hood. As the stretching device releases the stretch hood, the elastic contraction of the film tube around the item(s) provides integrity and stability to the palletized load. The stretch hood can also act to protect and shield the palletized load from damage and environmental factors (e.g., moisture) during transportation and storage. Moreover, the elastic properties of the pallet stretch hood enable it to stabilize goods of different shapes and sizes.

Stretch hood packaging systems may provide certain advantages over other packaging systems such as shrink hood, where a film tube is shrunk by the application of heat, or stretch wrap where a flat film is wrapped around the object or collection of objects to be packaged. Shrink hood films often contain a highly oriented polymer, such as low density polyethylene ("LDPE"), which allows the film to shrink as heat is applied. The shrinking process can consume a significant amount of energy and the high temperatures needed to shrink the film can create safety concerns. Additionally, as the shrink hood film is shrunk it tends to thicken and become stiff. Moreover, shrink hood films are not designed to stretch easily prior to heat shrinking. Stretch wrap films typically comprise a more linear polymer, such as linear low density polyethylene ("LLDPE"). A tackifying polymer or other ingredient is usually added to the stretch wrap film to establish sufficient cling force on the surface of the film. Stretch wrap films are relatively thin and are designed to stretch easily to considerable levels of over 200%. However, the additives needed to provide the film with sufficient cling force on the surface of the film can lead to roll blocking where the stretch wrap film clings to itself when rolled up. Additionally, wrapping a loaded pallet with a linear stretch wrap film can take a significant amount of time and there is often a waste of materials resulting from overlapping layers of the stretch wrap film. Furthermore, the stretch wrap film may only provide incomplete protection against environmental factors.

Different film structures have been suggested for stretch hood films. For example, U.S. Patent Application Publication No. 2006/0040075 discloses a polymer composition comprising a polyolefin, an ethylene acid copolymer, and an ethylene methyl acrylate copolymer for use in packaging materials such as pallet stretch hoods.

PCT Publication WO 2005/014672 discloses multi-layer stretch hood films comprising a core layer containing EVA having a low vinyl acetate content and skin layers comprising linear low density polyethylene.

PCT Publication WO 2006/076917 discloses stretch hoods formed from a biaxially oriented tubular film having a seam. The tubular film may comprise a core layer of an EVA and skin layers of linear low density polyethylene or EVA.

PCT Publication WO 2007/044544 discloses multi-layer elastic air quenched blown film structures having at least two layers. The first layer incorporates a propylene-based copolymer and optionally, a linear low density polyethylene or a low density polyethylene. The second layer incorporates a linear low density polyethylene and optionally, a propylene-based copolymer and/or a low density polyethylene. Alternatively, the second layer may contain an in-reactor blend of a substantially linear polyethylene (or a homogeneously branched linear polyethylene) and a linear low density polyethylene.

While there are many known film structures for stretch hood packaging systems, there remains a need for a stretch hood film that has improved properties and performance in stretch hood packaging systems. Desirably the film will have a better balance between stretchability and holding force. The film should provide package integrity and transparency, resistance to puncture and tearing, and/or reduced stress relaxation at higher ambient temperatures after the stretch hood packaging operation has been completed. Additionally, it would be desirable to have a stretch hood film that has increased "softness", i.e., the film has increased elasticity and enough holding force to adequately contain the palletized goods but is not so high as to damage the items on the palletized load. Desirably, the film is a single-sized film that can be applied to pallets of different sizes and shapes.

SUMMARY OF THE INVENTION

In one aspect, this disclosure relates to a film comprising at least one layer, wherein the layer comprises (a) 20 to 90 wt % of a first polymer component and (b) 80 to 10 wt % of a second polymer component, based on the total combined weight of the first polymer component and the second polymer component. In some embodiments, the film is a multi-layer film comprising a core layer and skin layers, wherein the skin layers may be the same or different and are arranged on each side of the core layer. At least one skin layer comprises 60 wt % of a linear low density polyethylene having a density in the range of 0.91 to 0.94 g/cm$^3$. In some embodiments, one or both skin layer contain less than 7500 ppm of antiblock particulates.

The first polymer component comprises (i) 65 to 95 wt % of propylene-derived units; and (ii) 5 to 35 wt % of ethylene-derived units and/or units derived from a $C_4$ to $C_{20}$ alpha-olefin. The first polymer component has a melt flow rate in the range of 0.5 to 50 dg/min and a heat of fusion of less than 75 J/g. In some embodiments, the first polymer component consists essentially of units derived from propylene and ethylene.

The second polymer component comprises ethylene-derived units and 1 to 20 wt % of units derived from a co-polymerizable ethylenically unsaturated ester. The second polymer component has (i) a melt index in the range of from 0.05 to 20 g/10 min; and (ii) a density in the range of 0.90 to 0.94 g/cm$^3$. In some embodiments, the second polymer component has a rheological relaxation time of at least 10 seconds. In some embodiments, the second polymer component has at least 10 per 1000 C-atoms of $C_1$ to $C_5$ short chain branches. In preferred embodiments, the second polymer component is an ethylene vinyl acetate copolymer.

In one embodiment, and in combination with any of the above disclosed aspects or embodiments, the film has an elastic recovery after a 100% stretch of at least 40% and provides a normalized holding force per 100 μm thickness pre-stretch at 85% stretch of at least 17 N/50 mm, after an initial stretch of 100%.

In one embodiment, and in combination with any of the above disclosed aspects or embodiments, the film is made by blown film extrusion in tubular form adapted to form a stretch hood upon stretching in the machine and transverse directions.

In another aspect this disclosure relates to a method for packaging an article with a stretch hood film. The method comprises (i) providing a tubular film, as described in the above aspect and embodiments, which is sealed on one end; (ii) stretching the film with a stretcher in the transverse direction beyond the external dimensions of the article; (iii) stretching the film with the stretcher in the machine direction; (iv) pulling the film downwards over the article; and (v) releasing the film from the stretcher, wherein the film's elastic recovery acts to form a stretch hood around the article.

These and other features, aspects, and advantages of the present disclosure will become better understood with regard to the following description and appended claims.

DETAILED DESCRIPTION OF THE INVENTION

Various specific embodiments, versions and examples will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

This disclosure generally relates to films which are useful for stretch hood applications. These films may also be useful as stretch sleeve labels for bottles or as agricultural films for silage or for collation shrink applications. The film generally comprises a blend of a first polymer component ("FPC") and a second polymer component ("SPC") in at least one layer. The FPC comprises units derived from propylene, ethylene, and/or a $C_4$ to $C_{20}$ alpha-olefin.

The SPC comprises an interpolymer of ethylene and a co-polymerizable ester. In preferred embodiments the film is a multilayer film wherein the core layer comprises a blend of a FPC and a SPC. The addition of the FPC to the core layer may aid in reducing the overall modulus of the film, aid in increasing the elasticity and elongation of the film, and may also aid in improving some toughness proprieties of the film such as the machine direction tear strength.

In one embodiment, the film comprises at least one layer wherein the layer comprises (a) from about 20 to about 90 wt % of a FPC and (b) from about 10 to about 80 wt % of the SPC, based on the combined weight of the FPC and the SPC.

The FPC comprises from about 65 to about 95 wt % of propylene-derived units and from about 5 to about 35 wt % of ethylene-derived units and/or a $C_4$ to $C_{20}$ alpha-olefin, based on the weight of the FPC. The FPC may have a melt flow rate in the range of 0.5 to 50 dg/min and a heat of fusion of less than 75 J/g. The SPC comprises ethylene-derived units and 1 to 20 wt % of units derived from a co-polymerizable ethylenically unsaturated ester, based on the weight of the SPC. The SPC may have a melt index in the range of from about 0.05 to about 20 dg/min and a density in the range of from about 0.90 to about 0.94 g/cm$^3$. In some embodiments, the film may have an elastic recovery after a 100% stretch of at least 40% and provide a normalized holding force per 100 μm thickness pre-stretch at 85% stretch after an initial stretch of 100% of a least 17 N/50 mm at a deformation rate of less than 10% of the starting length per second.

In some embodiments, the film is a multi-layer film and comprises a core layer and skin layers on each side of the core. The core layer comprises (a) from about 20 to about 90 wt % of a FPC and (b) from about 10 to about 80 wt % of the SPC, based on the combined weight of the FPC and the SPC. The skin layers may be the same or have different compositions. At least one skin layer comprises at least 60 wt % of a linear low density polyethylene ("LLDPE") having a density in the range of 0.91 to 0.94 g/cm$^3$. In some embodiments, the skin layer contains less than 7500 ppm of anti-block particulates.

First Polymer Component

The FPCs described herein are copolymers of propylene-derived units and one or more ethylene-derived units or a $C_4$-$C_{10}$ alpha-olefin.

The α-olefin comonomer may be linear or branched, and two or more comonomers may be used, if desired. Examples of suitable α-olefin comonomers include butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene.

In some embodiments the FPC may further comprise one or more diene-derived units. The FPC may have a comonomer content (i.e., ethylene and/or $C_4$-$C_{10}$ alpha-olefin content) in the range of from 3 to 35 wt %, based on the weight of the FPC. In general, the comonomer content is adjusted so that the FPC has a heat of fusion ("Hf") of less than or equal to 75 J/g and a melt flow rate ("MFR") in the range of 0.5 to 50 dg/min. In some embodiments, the FPC has an isotactic triad fraction in the range of about 65% to about 99%.

The FPC may incorporate propylene-derived units having crystalline regions interrupted by non-crystalline regions. The non-crystalline regions may result from regions of non-crystallizable polypropylene segments and/or the inclusion of comonomer units. The crystallinity and the melting point of the FPC may be reduced as compared to highly isotactic polypropylene by the introduction of errors in the insertion of propylene and/or by the presence of comonomer.

In some embodiments, the crystallinity of the FPC is reduced by the copolymerization of propylene with limited amounts of one or more comonomers selected from: ethylene, $C_4$-$C_{20}$ alpha-olefins, and optionally dienes. Preferred comonomers are ethylene, 1-butene, 1-hexane, and/or 1-octene. The FPC may comprise comonomer-derived units in an amount in the range of 5 to 35 wt %, or in the range of 5 to 28 wt %, or in the range of 5 to 25 wt %, or in the range of 5 to 20 wt %, or in the range of 5 to 16 wt %, or in the range of 6 to 18 wt %, or in some embodiments in the range of 7 to 20 wt % comonomer-derived units, based on the weight of the FPC. The comonomer content of the FPC may be determined by ASTM D3900.

In one embodiment, the FPC comprises at least 65 wt %, or at least 75 wt %, or at least 89 wt %, of propylene-derived units, based on the weight of the FPC. In another embodiment, the FPC comprises from 65 wt % to 95 wt %, or from 75 wt % to 95 wt %, or from 89 wt % to 93 wt %, or from 80 wt % to 90 wt %, of propylene-derived units, based on the weight of the FPC.

In some embodiments, when more than one comonomer is present, the amount of a particular comonomer may be less than 5 wt %, but the combined comonomer content is preferably greater than 5 wt %. When there is more than one comonomer unit in the copolymer, the total weight percent of the ethylene and/or $C_4$-$C_{10}$ alpha-olefin derived units may be in the range of 5 to 35 wt %, or in the range of 7 to 32 wt %, or in the range of 8 to 25 wt %, or preferably in the range of 8 to 20 wt %, or more preferably in the range of 8 to 18 wt %. Particular embodiments of copolymers having more than one comonomer units include propylene-ethylene-octene, propylene-ethylene-hexene, and propylene-ethylene-butene polymers. These copolymers may further comprise a diene.

In some embodiments, the FPC consists essentially of units derived from propylene and ethylene. The FPC may comprise 5 to 35 wt % of ethylene-derived units, or 5 to 30 wt %, or 5 to 25 wt %, or 5 to 20 wt % of ethylene-derived units, based on the total weight of the FPC. In one embodiment, the FPC comprises 10 to 12 wt % of ethylene-derived units, based on the total weight of the FPC. In another embodiment, the FPC comprises 15 to 20 wt % of ethylene-derived units, based on the total weight of the FPC. In other embodiments, the FPC may comprise 5 to 16 wt % of ethylene-derived units.

The FPC may optionally comprise less than or equal to 12 wt % diene-derived units (or "diene"), or less than or equal to 10 wt % diene, or less than or equal to 5 wt % diene, or preferably less than or equal to 3 wt % diene. In some embodiments the diene is present in the range of 0.1 to 9 wt %, or in the range of 0.1 to 6 wt %, or in the range of 0.1 to 5 wt %, or in the range of 0.1 to 4 wt %, or in the range of 0.1 to 2 wt %, or in the range of 0.1 to 1 w %. In other embodiments, the FPC may comprise the diene in amount in the range of from about 2.0 wt % to about 7.0 wt %, or in the range of about 3.0 wt % to about 5.0 wt %, based on the total weight of the FPC. The optional diene units may be derived from any hydrocarbon structure having at least two unsaturated bonds wherein at least one of the unsaturated bonds may be incorporated into a polymer. Suitable dienes include, but are not limited to: straight chain acyclic olefins such as 1,4-hexadiene and 1,6-octadiene; branched chain acyclic olefins such as 5-methyl-1,4-hexadiene, 3,7-dimethyl-1,6-octadiene, and 3,7-dimethyl-1,7-octadiene; single ring alicyclic olefins, such as 1,4-cyclohexadiene, 1,5-cyclooctadiene, and 1,7-cyclododecadiene; multi-ring alicyclic fused and bridged ring olefins such as tetrahydroindene, methyl-tetrahydroindene, dicyclopentadiene ("DCPD"), ethylidiene norbornene ("ENB"), norbomadiene, alkenyl norbornenes, alkylidene norbomenes, cycloalkelnyl noroborenes, and cycloalkylinene norbornenes (such as 5-vinyl-2-norbornene); cycloalkenyl-substituted alkenes, such as vinyl cyclohexene, allyl cyclohexene, vinyl cyclooctene, 4-vinyl cyclohexene, alkyl cyclodecene, vinyl cyclododecene, divinyl benzene, and tetracyclo (A-11,12)-5,8-dodecene; and combinations thereof. In certain embodiments, the diene is 5-ethylidene-2-norbornene, 5-vinyl-2-norbornene, or divinyl benzene. The diene, if present, is preferably ENB.

The FPC may have a melt flow rate ("MFR", ASTM D1238, 2.16 kg, 230° C.), greater than or equal to 0.2 dg/min, or greater than or equal to 0.5 dg/min. In some embodiment's the FPC's MFR is in the range of 0.5 to 50 dg/min, or in the range of 1 to 40 dg/min, or in the range of 2 to 35 dg/min, or in the range of 2 to 30 dg/min. In other embodiments, the FPC's MFR is in the range of 0.5 to 50 dg/min, or in the range of 2 to 10 dg/min, or in the range of 2 to 8 dg/min, or in the range of 3 to 5 dg/min.

In one embodiment, the FPC has a heat of fusion ("Hf"), as determined by the Differential Scanning Calorimetry ("DSC") procedure described herein, of greater than or equal to 0.5 J/g, or 1 J/g, or 5 J/g, and is less than or equal to 75 J/g, or preferably less than or equal to 70 J/g, or 50 J/g, or less than or equal to 35 J/g. Stated another way, in one or more embodiments, the Hf value may be within the range of 1.0, or 1.5, or 3.0, or 4.0, or 6.0, or 7.0 J/g to 30, or 35, or 40, or 50, or 60, or 70, or 75 J/g.

The FPC may have a percent crystallinity within the range of 0.5 to 40%, or in the range of 1 to 30%, or preferably in the range of 5 to 35%, wherein "percent crystallinity" is determined according to the DSC procedure described herein. The thermal energy for the highest order of propylene is estimated at 189 J/g (i.e., 100% crystallinity is equal to 189 J/g). In some embodiments, the FPC has a crystallinity less than 40%, or in the range of 0.25 to 25%, or in the range of 0.5 to 22%.

The procedure for DSC determinations is as follows. About 0.5 grams of polymer is weighed and pressed to a thickness of about 15 to 20 mils (about 381-508 microns) at about 140-150° C., using a "DSC mold" and MYLAR™ film as a backing sheet. The pressed polymer sample is allowed to cool to ambient temperatures by hanging in air (the MYLAR™ film backing sheet is not removed). The pressed polymer sample is then annealed at room temperature (about 23-25° C.). A 15-20 mg disc is removed from the pressed polymer sample using a punch die and is placed in a 10 microliter aluminum sample pan. The disc sample is then placed in a DSC (Perkin Elmer Pyris 1 Thermal Analysis System) and is cooled to about –100° C. The sample is heated at about 10° C./min to attain a final temperature of about 165° C. The thermal output, recorded as the area under the melting peak of the disc sample, is a measure of the heat of fusion and can be expressed in Joules per gram (J/g) of polymer and is automatically calculated by the Perkin Elmer system. Under theses conditions, the melting profile shows two (2) maxims, the maxima at the highest temperature is taken as the melting point within the range of melting of the disc sample relative to a baseline measurement for the increasing heat capacity of the polymer as a function of temperature.

The FPC may have a single peak melting transition as determined by DSC. In one embodiment, the FPC has a primary peak transition of less than about 90° C., with a broad end-of-melt transition of greater than about 110° C. The peak "melting point" ("Tm") is defined as the temperature of the greatest heat absorption within the range of melting of the sample. However, the copolymer may show secondary melting peaks adjacent to the principal peak, and/or at the end-of-melt transition, however for the purposes herein, such secondary melting peaks are considered together as a single melting point, with the highest of these peaks being considered the Tm of the FPC. The FPC may have a Tm of less than or equal to 115° C., or less than or equal to 100° C., or less than or equal to 90° C., or less than or equal to 80° C., or less than or equal to 70° C., or in one embodiment in the range of 25 to 100° C., or in the range of 25 to 85° C., or in the range of 25 to 75° C., or in the range of 25 to 65° C., or in the range of 30 to 80° C., or in the range of 30 to 70° C.

The FPC may have a weight average molecular weight ("Mw") in the range of 5,000 to 5,000,000 g/mole, or preferably in the range of 10,000 to 1,000,000 g/mole, or more preferably in the range of 50,000 to 400,000 g/mole. In some embodiments the FPC has a Mw greater than 10,000, or greater than 15,000, or greater than 20,000, or greater than 80,000 g/mole and less than 5,000,000, or less than 1,000,000, or less than 500,000 g/mole.

The FPC may have a number average molecular weight ("Mn") in the range of 2,500 to 2,500,00 g/mole, or preferably in the range of 10,000 to 250,000 g/mole, or more preferably in the range of 25,000 to 200,000 g/mole. The FPC may have a Mz within the range of 10,000 to 7,000,000 g/mole, or preferably in the range of 80,000 to 700,000 g/mole, or more preferably in the range of 100,000 to 500,000 g/mole.

The FPC may have a molecular weight distribution ("MWD") (Mw/Mn) within the range of 1.5 to 20, or in the range of 1.5 to 15, or in the range of 1.5 to 5, or preferably in the range of 1.8 to 5, or more preferably in the range of 1.8 to 3 or 4. In some embodiments the FPC's MWD is in the range of 1.5 or 1.8 or 2.0 to 4.5 or 5 or 10 or 20 or 40.

Techniques for determining the molecular weight (Mn, Mw, and Mz) and MWD are as follows, and as in Verstate et al, in 21 MACROMOLECULES 3360 (1988). Conditions described herein govern over published test conditions. Molecular weight and MWD are measured using a Waters 150 gel permeation chromatograph equipped with a Chromatix KMX-6 on-line light scattering photometer. The system is used at 135° C. with 1,2,4-trichlorobenze as the mobile phase. Showdex (Showa-Denko America, Inc.) polystyrene gel columns 802, 803, 804, and 805 are used. This technique is discussed in LIQUID CHROMATOGRAPHY OF POLYMERS AND RELATED MATERIALS III 207 (J. Cazes ed., Marcel Dekker, 1981). No corrections for column spreading were employed; however, data on generally acceptable standards, e.g. National Bureau of Standards Polyethylene 1484 and anionically produced hydrogenated polyisoprenes (an alternating ethylene propylene copolymer) demonstrate that such corrections on Mw/Mn or Mz/Mw are less than 0.05 units. Mw/Mn was calculated from an elution time-molecular relationship whereas Mz/Mw was evaluated using the light scattering photometer. The numerical analysis can be performed using the commercially available computer software GPC2, MOLWT2 available from LDC/Milton Roy-Rivera Beach, Fla.

Preferred FPCs may have a propylene tacticity index (m/r) ranging from a lower limit of 4 or 6 to an upper limit of about 8, 10, or 12. The propylene tacticity index, expressed herein as "m/r", is determined by $^{13}C$ nuclear magnetic resonance (NMR). The propylene tacticity index m/r is calculated as defined in H. N. Cheng, Macromolecules, 17, 1950 (1984). The designation "m" or "r" describes the stereochemistry of pairs of contiguous propylene groups, "m" referring to meso and "r" to racemic. An m/r ratio of 0 to less than 1.0 generally describes a syndiotactic polymer, an m/r ratio of 1.0 an atactic material and an m/r ratio of greater than 1.0 an isotactic material. Isotactic materials theoretically have a ratio approaching infinity, and many by-product atactic polymers have sufficient isotactic content to result in ratios of greater than 50.

The FPC may have an isotactic triad tacticity of three propylene units, as measured by $^{13}C$ NMR, of 75% or more, or 80% or more, or 82% or more, or 85% or more, or in some embodiments 90% or more. Preferably the triad tacticity is in the range of 50 to 99%, or in the range of 60 to 99%, or more preferably in the range of 75 to 99%, or in the range of 80 to 99%, or in the range of 70 to 98%, or in other embodiments in the range of 60 to 97%. As used herein, isotactic triad tacticity is defined to be an mm triad tacticity of three propylene units, as measured by $^{13}C$ NMR. The triad tacticity can be determined from a $^{13}C$ NMR spectrum of the polymer as described below and as described in U.S. Pat. No. 5,504,172, herein incorporated by reference. The mm triad tacticity of a polymer is the relative tacticity of a sequence of three adjacent propylene units, a chain consisting of head to tail bonds, expressed as a binary combination of m and r sequences. It is usually expressed for the FPCs as the ratio of the number of units of the specified tacticity to all of the propylene triads in the copolymer. The mm triad tacticity (mm fraction) of a propylene copolymer can be determined from a $^{13}C$ NMR spectrum of the propylene copolymer and the following formula:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the following three propylene unit chains consisting of head-to-tail bonds:

PPP(mm):

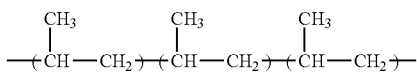

PPP(mr):

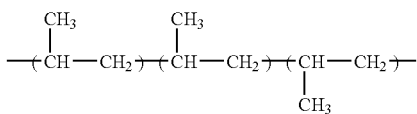

PPP(rr):

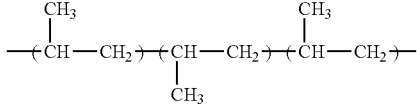

The spectrum relating to the methyl carbon region (19-23 parts per million (ppm)) can be divided into a first region (21.2-21.9 ppm), a second region (20.3-21.0 ppm) and a third region (19.5-20.3 ppm). Each peak in the spectrum was assigned with reference to an article in the journal Polymer, Volume 30 (1989), page 1350. In the first region, the methyl group of the second unit in the three propylene unit chain represented by PPP (mm) resonates. In the second region, the methyl group of the second unit in the three propylene unit chain represented by PPP (mr) resonates, and the methyl group (PPE-methyl group) of a propylene unit whose adjacent units are a propylene unit and an ethylene unit resonates (in the vicinity of 20.7 ppm). In the third region, the methyl group of the second unit in the three propylene unit chain represented by PPP (rr) resonates, and the methyl group (EPE-methyl group) of a propylene unit whose adjacent units are ethylene units resonates (in the vicinity of 19.8 ppm). The calculation of the triad tacticity is outlined in the techniques shown in U.S. Pat. No. 5,504,172. Subtraction of the peak areas for the error in propylene insertions (both 2,1 and 1,3) from peak areas from the total peak areas of the second region and the third region, the peak areas based on the 3 propylene units-chains (PPP(mr) and PPP(rr)) consisting of head-to-tail bonds can be obtained. Thus, the peak areas of PPP(mm), PPP(mr) and PPP(rr) can be evaluated, and hence the triad tacticity of the propylene unit chain consisting of head-to-tail bonds can be determined.

The FPC may have a density within the range of 0.850 to 0.920 g/cm³, or in the range of 0.860 to 0.900 g/cm³, or preferably in the range of 0.860 to 0.890 g/cm³ at room temperature as measured per the ASTM D-1505 test method.

The FPC may possess an Elongation at Break (ASTM D-412 at 23° C.) of less than 2000%, or less than 1000%, or less than 900%.

In one embodiment, the FPC has a Shore A hardness (ASTM D-2240 at 23° C.) of less than about 90. In another embodiment, the FPC a Shore A hardness of in the range of about 45 to about 90, or in the range of about 55 to about 80.

The FPCs described herein are not limited by any particular polymerization method for preparing the FPC. The FPCs can include copolymers prepared according to the procedures in WO 00/01745, WO 02/36651, U.S. Pat. Nos. 6,992,158, 6,881,800, and 7,232,871, all of which are herein incorporated by reference. Examples of commercially available FPCs include resins sold under the trade names VISTAMAXX™ (ExxonMobil Chemical Company, Houston, Tex., USA) and VERSIFY™ (The Dow Chemical Company, Midland, Mich., USA).

In one embodiment the FPC comprises 80 to 90 wt % propylene-derived units and 10 to 20 wt % of ethylene-derived units. The FPC has a density in the range of 0.855 to 0.870 g/cm$^3$ and an MFR in the range of 2 to 4 dg/min. The FPC may have a Shore A hardness in the range of 60 to 70. The FPC may have a percent crystallinity in the range of 3 to 10%.

In another embodiment the FPC comprises 85 to 95 wt % propylene-derived units and 5 to 15 wt % ethylene-derived units. The FPC has a density in the range of 0.865 to 0.880 g/cm$^3$ and an MFR in the range of 2 to 4 dg/min. The FPC may have a Shore A hardness in the range of 80 to 95. The FPC may have a percent crystallinity in the range of 5 to 15%.

In the films described herein, there can be one or more different FPCs, "different" meaning that the copolymers each have one or more different properties, such as, a different comonomer content, comonomer identity, and/or some other distinct property, but such that all of the FPCs fall within the broadest description of those copolymers described herein.

Second Polymer Component

The SPCs described herein are interpolymers of ethylene and a co-polymerizable ester. The ethylene derived units suitably form at least 80 wt % of the SPC, based on the weight of the SPC.

The SPC comprises ethylene and 1 to 30 wt % of units derived from a co-polymerizable ethylenically unsaturated ester ("ester-derived units"), based on the total weight of the SPC. In some embodiments, the SPC comprises ethylene and 1 to 18 wt %, or 1.5 to 15 wt %, or 2 to 10 wt %, or 2.5 to 9 wt %, or 3 to 8 wt %, of ester-derived units. In another embodiment, the SPC comprises ethylene and 1.0 to 10.0 wt %, or 1.5 to 9.0 wt %, or 1.7 to 8.5 wt %, or 2.0 to 8.0 wt %, of ester-derived units. In a further embodiment, the SPC comprises ethylene and 2.1 to 10 wt %, or 3.0 to 9.0 wt %, or 3.5 to 8.0 wt %, or 4.0 to 7.7 wt %, of ester-derived units.

The co-polymerizable ethylenically unsaturated ester may be vinyl acetate, methyl acrylate, butyl acrylate, ethyl acrylate, or a combination thereof. In some embodiments, the ethylenically unsaturated ester may be ethylene methacrylate and its higher acrylate analogues such as ethylene ethyl acrylate but is preferably ethylene vinyl acetate copolymer. In preferred embodiments the co-polymerizable ethylenically unsaturated ester is vinyl acetate.

The SPC may have a melt index ("MI", ASTM D-1238, Condition E) of less than or equal to 20 dg/min, or less than or equal to 15 g/10 min, or less than or equal to 10 g/10 min, or in some embodiments less than or equal to 5 g/10 min. In some embodiments, the SPC may have a MI in the range of 0.05 to 20 g/10 min, or in the range of 0.05 to 15 g/10 min, or in the range of 0.1 to 10 g/10 min, or in the range of 0.15 to 8 g/10 min, or in the range of 0.2 to 5 g/10 min, or in the range of 0.25 to 3.5 g/10 min. In other embodiments, the SPC may have a MI in the range of 0.1 to 4 g/10 min, or in the range of 0.2 to 2 g/10 min, or in the range of 0.25 to 1 g/10 min.

In some embodiments, the SPC contains at least four, preferably at least five, short chain branches ("SCBs") per thousand carbon atoms containing three carbon atoms or less. In other embodiments, the SPC has at least 10 per 1000 C-atoms of SCBs containing five carbon atoms or less. In further embodiments, the number of SCBs containing 5 carbon atoms or less is less than 30, or preferably less than 20, per 1000 C-atoms. As used herein, short chain branching refers to alkyl branches, detectable through 13C NMR techniques and excludes acetoxy branches from the incorporation of the co-polymerizable ethylenically unsaturated ester (e.g., from a vinyl acetate comonomer). Short chain branching as so defined in polymers made in high-pressure free-radical polymerization, results mainly from Roedel backbiting mechanisms that lead to ethyl and butyl type branches as well as some higher levels of branching. Other SCBs result from the incorporation along the chain of (X-olefins which have generally the effect or the intent of lowering the molecular weight and are referred to as telogens or transfer agents. The use of propylene transfer agent results in methyl-type SCBs. The use of isobutylene would also result in methyl-type SCBs. Using NMR techniques the number of carbon atoms in the SCB can be determined and also the number of the respective types of SCBs. Where reference is made 1000 C atoms as the basis for expressing the amount of short chain branching or long chain branching, the reference to the 1000 C atoms refers to all carbon atoms, including carbon atoms in acetoxy groups, unless otherwise mentioned. NMR techniques struggle to differentiate branches having six or more carbon atoms and these are referred to collectively as long chain branches ("LCBs"). The presence of LCBs in whatever amount or structure is reflected in the relaxation time.

The SPC may have a density (ASTM D-1505) in the range of from 0.91 to 0.951 g/cm$^3$, or in the range of 0.91 to 0.935 g/cm$^3$, or preferably in the range of 0.92 to 0.93 g/cm$^3$.

In some embodiments, the SPC may have a relaxation time, as described herein, of at least 10 seconds, or at least 11 seconds. In other embodiments, the SPC has a relaxation time in the range of 10 to 20 seconds, or in the range of 11 to 15 seconds. The relaxation time is theologically derived and reflects the time taken for the polymer chains to relax after deformation in a molten condition. It is influenced by aspects of the polymer structure such as the long chain branching level, molecular weight, and molecular weight distribution. If the relaxation time is too high the polymer will strain harden prematurely during cold stretching. Thus, a higher relaxation time encourages balanced melt orientation of the film during blown film extrusion. In use Transverse Direction (TD) stretching will then permit some stretching in the Machine Direction (MD) without rupture to provide a top to bottom holding force in addition to a sideways holding force.

The SPCs described herein are not limited by any particular polymerization method for preparing the SPC. In some embodiments, the SPC may conveniently be produced in free-radical polymerization. The free radical polymerization may be performed in a stirred autoclave but is preferably produced in a tubular reactor. In some embodiments, the SPC may be produced be a free radical polymerization process comprising feeding ethylene and a co-polymerizable ethylenically unsaturated ester and a chain transfer agent under conditions favoring formation of SCBs by backbiting and propylene incorporation. Initiators that may be used include oxygen, peroxides, and similar agents. The chain transfer agent, which is instrumental in increasing the amount of short chain branching, is typically an alpha-olefin. Preferably the chain transfer agent consists substantially of propylene (i.e., propylene comprises preferably from 60 to 100% of the total transfer agent content), however, smaller amounts of other transfer agents (e.g., isobutylene, aldehydes) may be used. The highly exothermic reaction may be performed in a reactor operating under high pressure (2000 to 3200 bar), under turbulent flow and at high temperatures (150 to 330° C.). The heat of polymerization is removed through the tube wall. Operating conditions like reactor pressure, reactor temperature in the different reaction zones and co-monomer and chain transfer agent concentrations can be adjusted to achieve the required polymer properties.

In one embodiment, the SPC comprises ethylene and from 1 to 20 wt % of units derived from a co-polymerizable ethylenically unsaturated ester. The SPC has at least 10 per 1000 C-atoms of SCBs containing 5 carbon atoms or less. The SPC has a MI in the range of 0.5 to 20 g/10 min and a density in the range of 0.91 to 0.935 g/cm$^3$, and a relaxation time of at least 10 seconds.

In another embodiment, the SPC comprises ethylene and 1 to 10 wt % of ester-derived units. The SPC has a MI in the range of 0.1 to 5 g/10 min and a density in the range of 0.920 to 0.930 g/cm$^3$.

In yet another embodiment, the SPC comprises ethylene and 2 to 8 wt % vinyl acetate, based on the weight of the SPC. The SPC has a density in the range of 0.920 to 09.30 g/cm$^3$ and a MI in the range of 0.2 to 3.2 g/10min.

In still another embodiment, the SPC comprises ethylene and 5 to 9 wt % vinyl acetate, based on the weight of the SPC. The SPC has a density in the range of 0.923 to 0.928 g/cm$^3$ and a melt index in the range of 0.3 to 0.7 g/10 min.

In a further embodiment, the SPC comprises ethylene and 4 to 10 wt % vinyl acetate, based on the weight of the SPC. The SPC has a density in the range of 0.915 to 0.938 and a MI in the range of 0.5 to 5 g/10 min. The use of such a SPC may contribute to the stretch hood's ability to snap-back, that is to say the speed of elastic recovery.

In the films described herein, there can be one or more different SPCs, "different" meaning that the interpolymers each have one or more different properties, such as, a different co-polymerizable ethylenically unsaturated ester content, ester identity, and/or some other distinct property, but such that all of the SPCs fall within the broadest description of those interpolymers described herein.

Film Compositions

The films described herein generally comprise a blend of the FPC and the SPC in at least one layer. In some embodiments, the films are multilayer films having two, three, or more layers. In one embodiment, each layer is extruded separately, then combined to form one film structure. In other embodiments, the film layers may be co-extruded. Suitable multi-layer film structures include, for example, "ABA," wherein a film having the "ABA" structure has three layers, a middle core layer made from "B," and outer skin "A" layers on either face of "B." Non-limiting examples of other structures include "A" only, "B" only, AB, BAB, ABA, AAB, AABAA, BABB, BBAB, BBAABB, ABABA, BABAB, AABBBA, and other variants comprising from 2 or 3 to 5 or 6 or 7 or 8 or more layers. In some embodiments, the multilayer film has an A/B/C structure where C may be the same as or different from A.

The core layer of the film preferably comprises a blend of the FPC and the SPC. In one embodiment, the core layer comprises from 20 to 90 wt % of the FPC and from 10 to 80 wt % of the SPC, based on the combined weight of the FPC and the SPC. In another embodiment, the core layer comprises 25 to 85 wt % of the FPC and from 15 to 75 wt % of the SPC. In a further embodiment, the core layer comprises from 30 to 70 wt % of the FPC and from 70 to 30 wt % of the SPC.

In one embodiment, the core layer may further comprise small amounts, generally less than 40 wt %, of a linear very low density polyethylene having a density in the range of from 0.86 to 0.90 g/cm$^3$, a LLDPE having a density in the range of from 0.91 to 0.94 g/cm$^3$, or a mixture thereof.

In some embodiments the film is a multi-layer film and comprises a skin layer on each side of the core. The skin layers may be of the same or different composition. In preferred embodiments at least one skin layer comprises at least one linear low density polyethylene ("LLDPE"). The other skin layer may be the same or may comprise a different LLDPE or a non-LLDPE material. Preferably at least one skin layer, and in some embodiments both skin layers, comprises at least 50 wt %, or at least 60 wt %, or at least 75 wt %, or at least 80 wt %, or at least 90 wt %, or at least 95 wt %, based on the total weight of the polymers contained in the skin layer, of one or more LLDPEs. In preferred embodiments, the LLDPE has a density in the range of 0.91 to 0.94 g/cm$^3$. In some embodiments, the LLDPE may have a molecular weight distribution (Mw/Mn) in the range of 2.0 to 8, or in the range of 2.5 to 8, or in the range of 4 to 7. In other embodiments, the LLDPE may have a molecular weight distribution in the range of 2.3 to 3.5.

The LLDPE(s) contained within the skin layer(s) may be prepared by any polymerization method. For example, the LLDPE may be made by gas phase, slurry, or solution polymerization. In some embodiments, the LLDPE can be conveniently prepared by polymerization using a transition metal compound as a catalyst while in other embodiments the LLDPE may be made using a single site catalyst (e.g. a metallocene). The LLDPE for the skin layer of the film may be made by gas phase polymerization processes such as those described in WO94/25495, incorporated herein by reference.

In one embodiment, one or both of the skin layers may further comprise, in admixture with the LLDPE, small amounts, generally less than 20 wt % of a high pressure low density polyethylene, a linear high density polyethylene, polypropylene, or a combination thereof.

One or more of the various film layers may contain an additive. In some embodiments, the skin layer(s) contain less than 7500 ppm, preferably less than 3000 ppm, of anti-block particulates. The anti-block particulates project from the surface of the film to aid in reducing the areas of inter-film contact. The use of anti-block particulates is generally minimized to maintain film clarity. Preferably the skin layer contains less than 2500 ppm of anti-block particulate, or more preferably less than 2000 ppm.

The amount of slip agent employed in the film, especially in the skin layers, is preferably less than 500 ppm in any one layer. If there is too much slip agent employed, then the coefficient of friction will become too low, with resultant poor film handling in the packaging machine. In some embodiments 150 to 300 ppm of slip agent is used in one or both skin layers. Examples of slip agent that may be used are primary or secondary amides, such as erucamide and oleamide. In addition to, or instead of slip agent, an anti-agglomeration additive, such as a stearate, may be used. If employed, such an anti-agglomeration additive would normally be used in an amount greater than the amount of slip agent used. For example, in some embodiments, 1000 to 5000 ppm of an anti-agglomeration slip agent is used in one or both skin layers.

The skin layers may jointly constitute from 10 to 60% of the overall film thickness, or in some embodiments from 30 to 50% of the overall film's thickness. The film thickness can vary within plus or minus 5% of the average, while still minimizing wash boarding. The average thickness of the film before stretching may vary from 25 to 300 µm. In some embodiments, the overall average film thickness may be in the range of from 25 to 75µm while still providing satisfactory stretch hood packaging performance.

Without being bound by theory, it is believed that the core and skin layers each make distinct contributions to the overall film properties. When the polymer composition of the skin and core layers are blended into a single layer, the effects differ from when they are used in distinct layers. Each layer makes its own contribution. By selecting a suitable combination of skin and core layers, a film can be made which permits considerable stretching while retaining its physical integrity and tear resistance, while at the same time the core layer remains able to provide an optimized contracting force.

The film may have an Elmendorf tear strength (ASTM D1922) of at least 10 g/µm in both the machine and transverse directions. In some embodiments, the film may have an Elmendorf tear strength in the in the MD of greater than 12 g/µm, or greater than 15 g/µm. In one embodiment, the Elmendorf tear strength (MD) is 15.7 g/µm. In some embodiments, the film may have an Elmendorf tear strength in the TD of greater than 15 g/µm, or greater than 16 g/µm, or greater than 17 g/µm. In one embodiment, the Elmendorf tear strength (MD) is 18.9 g/µm. In preferred embodiments, the film has an Elmendorf tear strength in both the MD and the TD that is at least 10 g/µm, preferably at least 12 g/µm, and less than 25 g/µm.

In various embodiments, the film has a secant modulus in both the transverse and machine directions of less than about 170 MPa, or less than 150 MPa, or less than 130 MPa The film may have an elastic recovery after a 100% stretch of at least 40%. In some embodiments, the film may have an elastic recovery after a 100% stretch of at least 45%, or at least 50%, or at lest 52%.

The film may provide a normalized holding force per 100 µm thickness pre-stretch at 85% stretch, after an initial stretch of 100%, at a deformation rate of less than 10% of the original starting length per second of at least 15 N/50 mm. In some embodiments the film has a normalized holding force of at least 17 N/50 mm, or at least 20 N/50 mm.

The holding force and elastic recovery can be determined by a method based on an ASTM D5459 standard test method for elastic recovery, permanent deformation, and stress retention of stretch film but modified in that the film sample is stretched to a certain elongation (100%) at a certain cross-head speed (1000 mm/min). When the 100% elongation is reached, the cross-head is kept in this position for 5 sec and then reversed to a certain 85% elongation. The load on the sample is then measured after a 60 sec waiting time in (N/50 mm) and recorded as the holding force. This mimics the holding force acting on the palletized load. Subsequently the cross-head is returned to a position where the force reads zero. The % elongation is recorded as the elastic recovery. The normalized holding force is calculated by adjusting the holding force according to the thickness of the film to a thickness of 100 µm N/50 mm (e.g. the measured value is doubled for a film with an initial thickness of 50 µm).

In one embodiment, the film is a multi-layer film and comprises a core layer and skin layers on each side of the core. The core layer comprises (a) from about 20 to about 90 wt % of a FPC and (b) from about 10 to about 80 wt % of the SPC, based on the combined weight of the FPC and the SPC. The skin layers each contain at least 60 wt % of an LLDPE having density in the range of 0.91 to 0.94 g/cm$^3$. The skin layer contains less than 7500 ppm of anti-block particulates. The film has an elastic recovery after a 100% stretch of at least 40% and provides a normalized holding force per 100 µm thickness pre-stretch at 85% stretch after an initial stretch of 100% of a least 17 N/50 mm at a deformation rate of less than 10% of the starting length per second.

In another embodiment, the film is a multi-layer film and comprises a core layer and skin layers on each side of the core. The core layer comprises (a) from about 20 to about 40 wt % of a FPC and (b) from about 60 to about 80 wt % of the SPC, based on the combined weight of the FPC and the SPC. The FPC comprises 80 to 90 wt % propylene-derived units and 10 to 20 wt % of ethylene-derived units, and has a density in the range of 0.855 to 0.870 g/cm$^3$ and an MFR in the range of 2 to 4 dg/min. The skin layers comprise an LLDPE having density in the range of 0.91 to 0.94 g/cm$^3$. The film has a Elmendorf tear strength in both the MD and the TD of at least 12 g/µm. The film has an elastic recovery after a 100% stretch of at least 50% and provides a normalized holding force per 100 µm thickness pre-stretch at 85% stretch after an initial stretch of 100% of a least 20 N/50 mm at a deformation rate of less than 10% of the starting length per second.

In yet another embodiment, the film is a multi-layer film and comprises a core layer and skin layers on each side of the core. The core layer comprises (a) from about 20 to about 40 wt % of a FPC and (b) from about 60 to about 80 wt % of the SPC, based on the combined weight of the FPC and the SPC. The FPC comprises 85 to 95 wt % propylene-derived units and 5 to 15 wt % ethylene-derived units, and has a density in the range of 0.865 to 0.880 g/cm$^3$ and an MFR in the range of 2 to 4 dg/min. The skin layers comprise an LLDPE having density in the range of 0.91 to 0.94 g/cm$^3$. The film has an Elmendorf tear strength in both the MD and the TD of at least 20 g/µm. The film has an elastic recovery after a 100% stretch of at least 53% and provides a normalized holding force per 100 µm thickness pre-stretch at 85% stretch after an initial stretch of 100% of a least 20 N/50 mm at a deformation rate of less than 10% of the starting length per second.

In a further embodiment, the film is a multi-layer film and comprises a core layer and skin layers on each side of the core. The core layer comprises (a) from about 60 to about 80 wt % of a FPC and (b) from about 20 to about 40 wt % of the SPC, based on the combined weight of the FPC and the SPC. The FPC comprises 80 to 90 wt % propylene-derived units and 10 to 20 wt % of ethylene-derived units, and has a density in the range of 0.855 to 0.870 g/cm$^3$ and an MFR in the range of 2 to 4 dg/min. The skin layers comprise an LLDPE having density in the range of 0.91 to 0.94 g/cm$^3$. The film has an Elmendorf tear strength in both the MD and the TD of at least 15 g/µm. The film has an elastic recovery after a 100% stretch of at least 50% and provides a normalized holding force per 100 µm thickness pre-stretch at 85% stretch after an initial stretch of 100% of a least 20 N/50 mm at a deformation rate of less than 10% of the starting length per second.

Industrial Application

The films described herein are particularly useful in stretch hood film applications. The multi-layer film may be made by blown film extrusion in tubular form. The tubular film is then adapted to form a stretch hood capable of transverse direction extension of at least 100% and subsequent elastic recovery. The application of a film tube to package the object or collection of objects on a stretch hood packaging machine involves the steps described by way of example in EP0461667, where the top of the stretch hood is sealed.

In a first step (see FIG. 1 and 2 of EP0461667) a flattened film tube is unrolled and opened up to fit around a stretcher, which may be in the form of a frame as shown or in the form of four corner devices as illustrated in FIG. 6. At this stage the top of the tube can be heat sealed before it is cut-off, creating an inverted bag. The stretcher device can enter the inverted bag from below. The film material is gathered around the stretcher by take down rollers at each corner (not shown in the Figures). The film is gripped in a nip between the stretcher and the rollers. The takedown rollers cause the film to be folded transversely and gathered on the stretcher. The film and rollers have to have enough friction for an efficient gathering and take down operation. The heat sealing at the top end of the tube requires high hot tack and seal strength to survive subsequent stretching. The gathered, transversely folded tube is then expanded by the stretcher in the transverse film direction beyond the external dimensions of the palletized load. This requires a pre-determined elasticity that permits stretching and a reversion of the stretch later upon relaxation (see FIG. 3 of EP0461667). The expanded stretcher with the transversely stretched film tube is then passed downwards over the palletized load unfolding and releasing the film (see FIG. 4 of EP0461667). This requires that the film tube, in its tensioned condition, has a moderate coefficient of friction with the stretcher to allow it to be released easily from the stretcher while at the same time submitting the film to a sufficient force in the machine direction to achieve a moderate degree of machine direction stretch. The stretcher remains in the expanded state after releasing the lower edge of the film hood and returns upwards to the starting positions past the hood, sealed at the top, now contracted around the palletized load.

More information on the use of films in stretch hood packaging machines can be found in WO 2005/042346; WO 2006/076917; U.S. Pat. Nos. 6,470,654; 7,320,403; and 7,234,389, all of which are incorporated herein by reference.

In some embodiments, the stretch hood is sealed at one end to protect and cover the top of the palletized load. Alternatively in other embodiments where protection is a lower priority, the stretch hood may be open at the top.

In the course of applying the stretch hood to a palletized load, the film may undergo major levels of stretching (well over 50%) on the stretching device of the stretch hood packaging machine. The resistance to stretching by friction against a gripper surface of the stretch hood packaging machine should be minimized, particularly when thin films are used which become even thinner in the course of stretching.

Preferably the film has a coefficient of friction suitable for stretch hood packaging. In some embodiments, the film has a coefficient of friction in the range of from 0.2 to 1.0, or in the range of from 0.3 to 0.8, and or in the range of from 0.4 to 0.7.

The inventive films can be used to optimize stretch hood systems by minimizing the amount of film needed. The films can be applied and the packaged goods stored in a wide range of temperature conditions. In production by blown extrusion, good bubble stability can be achieved and the resulting film can have a high transparency due to the low amount of particulate anti-block needed.

The films described herein can be used to minimize the amount of film material needed to establish a sufficient holding force and also to optimize the film behavior during extension and after contraction around a load on a stretch hood packaging line with reduced risk of tearing or puncturing. Additionally, the films described herein can allow the stretch hood to have increased "softness," wherein the film has sufficient holding force to surround and stabilize the goods but not to much holding force where the goods are damaged. Furthermore, due to optimal balance of elasticity and holding force provided by the films described herein, the films can be used as stretch hoods for pallets of more than one size (e.g., a "one-size-fits-all" film).

Improved stretch hood film characteristics may be exploited to lower the cost of stretch hood packaging by reducing the weight of films used by employing thinner and/or more highly stretched films. The improved characteristics may also be employed to strengthen the holding force, transparency etc. so as to qualify stretch hood packaging films for more demanding applications where until now their performance had not been sufficient.

EXAMPLES

The multi-layer films for use in stretch hood applications will now be further described with reference to the following non-limiting examples.

The holding force and elastic recovery of the stretch hood film were determined by a method based on an ASTM D5459 standard test method for elastic recovery, permanent deformation, and stress retention of stretch film but modified in that the film sample was stretched to a certain elongation (100%) at a certain cross-head speed (1000 mm/min). When the 100% elongation was reached, the cross-head was kept in this position for 5 sec and then reversed to a certain 85% elongation. The load on the sample was then measured after a 60 sec waiting time in (N/50 mm) and recorded as the holding force. This mimics the holding force acting on the palletized load. Subsequently the cross-head was returned to a position where the force read zero. The elongation was recorded as the elastic recovery. The normalized holding force was calculated by adjusting the holding force according to the thickness of the film to a thickness of 100 μm N/50 mm.

The stretch hood tear propagation test was based on ASTM 882 but modified in that a film sample (50*50 mm) with a small pre-cut (2 mm wide in MD) was stretched in TD to 100% elongation at 1000 mm/min cross head speed. To pass the test the film should not tear uncontrolled but show an intermittent tear propagation behavior. The Fmax was where the tearing was arrested and further force application was required to restart it.

The puncture force was measured to determine the low speed puncture properties of the stretch hood film samples. The method aims to provide load versus deformation response under multi-axial deformation conditions at a fixed relatively low test speed (500 mm/min) to mimic the conditions under which the stretch hood immobilizes a palletized load with sharp articles. In this test a piston with a standard probe fixed to a load cell was pushed through a film sample in a circular sample holder with a 90 mm diameter until the film punctures and breaks. The load was measured on the load cell and the deformation is measured by the travel of the cross-head.

The stretch hood relaxation test was as follows: The relaxation test was performed using a test jig equipped with two vertically spaced horizontal bars. The upper bar is movable vertically to apply a predetermined elongation to the film, which is attached to the bars in the form of a sleeve 50 mm wide by 100 mm long. The lower bar is attached to a strain gauge to measure the force acting on the film and the force is recorded using a data-logger. The test at elevated temperature is performed by putting the whole test jig into a hot-air heated oven at the desired temperature. To simulate the initial force acting on a shrink film, the film is pre-tensioned to 3% elongation which corresponds to the tension typically found in commercially used pallet shrink film. The predetermined elongation applied to the film as tested was developed by stretching by an initial 75% and then allowing the film to relax back to 60%. The jig can be subjected to the desired heating and cooling cycles to record the increase or decrease from the initial tension.

Elongation at break, tensile strength at break, and 1% secant modulus were determined by a test method based on ASTM D-882 using an INSTRON™ testing machine.

Static and kinetic coefficients of friction (COF) were determined substantially in accordance with ASTM D-1894. The COF of film against film was measured with a 200 g weight at 150 mm/min for 150 mm length.

The melt index ($I_2$) was determined according to ASTM D-1238.

Haze was determined according to ASTM D-1003.

Elemendorf Tear was determined by a test method based on ASTM D-1922.

The film's gloss at 45° may be determined by ASTM D-2457.

A listing of the various components used in the example films in TABLE 1.

TABLE 1

Various Components Used in the Examples

| Component | Brief Description | Commercial Source |
|---|---|---|
| Vistamaxx ™ 6102 | Copolymer of propylene and ethylene (84 wt % C3, 16 wt % C2), having a density of 0.863 g/cm³ and a MFR of 3.0 dg/min. | ExxonMobil Chemical Company |
| Vistamaxx ™ 3020 | Copolymer of propylene and ethylene (89 wt % C3, 11 wt % C2), having a density of 0.873 g/cm³ and a MFR of 2.0 dg/min. | ExxonMobil Chemical Company |
| Nexxstar ™ 00111 | Ethylene vinyl acetate copolymer (7.5 wt % vinyl acetate), having a density of 0.925 g/cm³ and a MI of 0.5 dg/min. | ExxonMobil Chemical Company |
| Exceed ™ 1018 | mLLDPE having a density of 0.918 g/cm³ and a MI of 1 dg/min. | ExxonMobil Chemical Company |

Example 1

The first polymer components (Vistamaxx™ resins) and the second polymer component (Nexxstar™ resin) were supplied in pelletized form and were blended in the blown film extruder. The films in Example 1 had the core layer compositions as shown in TABLE 2. The skin layers of each film in Example 1 contained Exceed™ 1018 mLLDPE. The films were tested for a variety of properties, with the results shown in TABLE 3.

TABLE 2

Core Layer Compositions of Example 1 Films

| | FPC | SPC |
|---|---|---|
| Film A | — | 100% Nexxstar ™ 00111 |
| Film B | 30% Vistamaxx ™ 6102 | 70% Nexxstar ™ 00111 |
| Film C | 30% Vistamaxx ™ 3020 | 70% Nexxstar ™ 00111 |
| Film D | 70% Vistamaxx ™ 3020 | 30% Nexxstar ™ 00111 |

TABLE 3

Example 1 Film Properties

| | Film A | Film B | Film C | Film D |
|---|---|---|---|---|
| Tensile Properties | | | | |
| 500 mm/min Machine Direction | | | | |
| 1% Secant Modulus (%) | 175 | 135 | 146 | 134 |
| 10% Offset Yield Stress (MPa) | 10 | 7.5 | 8.2 | 7.6 |
| Tensile at Break (MPa) | 30.9 | 33.1 | 37.6 | 33.6 |
| Elongation at Break (%) | 566 | 687 | 704 | 708 |
| Energy to Break (m³/mm³) | 97 | 103 | 119 | 104 |
| Transverse Direction | | | | |
| 1% Secant Modulus (%) | 181 | 136 | 147 | 130 |
| 10% Offset Yield Stress (MPa) | 9.5 | 7.3 | 8.1 | 7.5 |
| Tensile at Break (MPa) | 32.3 | 32 | 35.8 | 30.5 |
| Elongation at Break (%) | 629 | 692 | 709 | 702 |
| Energy to Break (m³/mm³) | 96 | 97 | 110 | 95 |
| Stretch Hood Tear Test - TD | | | | |
| Fmax - F95% (N) | 46 | 50.78-45.2 | 56.94-48.8 | 52.07-46.1 |
| Stretch Hood Test - TD | | | | |
| 100%-85% | | | | |
| Start Force (N) | 52.3 | 51.82 | 56.51 | 51.61 |
| End Force (N) | 25.4 | 26.96 | 28.68 | 25.4 |
| Stress Retention (%) | 48.5 | 52.00 | 50.70 | 48.5 |
| Normalized for 100 μm Films | | | | |
| Start Force (N) | 50.4 | 42.56 | 46.70 | 50.4 |
| End Force (N) | 24.5 | 22.14 | 23.70 | 24.5 |
| Elastic Recovery (%) | 48.8 | 53.29 | 53.72 | 48.8 |
| Elmendorf Tear (g/μm) | | | | |
| MD | 10.4 | 12.6 | 15.2 | 20.4 |
| TD | 16.7 | 15.9 | 18.4 | 24.3 |
| Optical Properties | | | | |
| Haze (%) | 16.0 | 13 | 11 | 15 |
| Gloss at 45° | — | 69 | 71 | 61 |
| Clarity (%) | — | 40 | 38 | 34 |
| Coefficient of Friction Outside/Outside | | | | |
| Static | — | 0.31 | 0.32 | 0.31 |
| Kinetic | — | 0.28 | 0.28 | 0.3 |
| Inside/Inside | | | | |
| Static | 0.27 | 0.62 | 0.56 | 0.54 |
| Kinetic | 0.29 | 0.71 | 0.6 | 0.58 |
| Dartdrop (g) | — | No break at 1460 g | No break at 1460 g | No break at 1460 g |

The films in Example 1 which contained both the FPC and the SPC in the core layer (Films B, C, and D) exhibited improved puncture resistance and Elmendorf tear as compared to Film A which contained only the SPC in the core layer. Additionally, Films B, C, and D exhibited improved elastic recovery as compared to Film A.

Example 2

The first polymer components (Vistamaxx™ resins) and the second polymer component (Nexxstar™ resin) were supplied in pelletized form and were blended in the blown film extruder. In films in Example 2 had the core layer compositions as shown in TABLE 4. The skin layers of each film contained Exceed™ 1018 mLLDPE. The films were tested for a variety of properties, with the results shown in TABLE 5.

TABLE 4

Core Layer Compositions of Example 2 Films

| | FPC | SPC |
|---|---|---|
| Film E | — | 100% Nexxstar ™ 00111 |
| Film F | 30% Vistamaxx ™ 3020 | 70% Nexxstar ™ 00111 |
| Film G | 30% Vistamaxx ™ 6102 | 70% Nexxstar ™ 00111 |
| Film H | 60% Vistamaxx ™ 3020 | 40% Nexxstar ™ 00111 |

TABLE 5

Example 2 Film Properties

| | Film E | Film F | Film G | Film H |
|---|---|---|---|---|
| Tensile Properties | | | | |
| Machine Direction | | | | |
| 1% Secant (psi, MPa) | 18,724 psi (129.1 MPa) | 16,351 psi (112.74 MPa) | 14,561 psi (100.39 MPa) | 15,715 psi (108.35 MPa) |
| Yield Strength (psi, MPa) | 1,008 psi (6.95 MPa) | 879 psi (6.06 MPa) | 806 psi (5.55 MPa) | 797 psi (5.50 MPa) |
| Tensile Strength (psi, MPa) | 4,378 psi (30.19 MPa) | 5,445 psi (37.54 MPa) | 4,798 psi (33.08 MPa) | 5,527 psi (38.11 MPa) |
| Elongation at Yield (%) | 6.3 | 6.2 | 6.3 | 6.5 |
| Elongation at Break (%) | 590 | 702 | 665 | 728 |
| Transverse Direction | | | | |
| 1% Secant (psi, MPa) | 19,539 psi (134.72 MPa) | 17,242 psi (118.88 MPa) | 15,764 psi (108.69 MPa) | 15,715 psi (108.35 MPa) |
| Yield Strength (psi, MPa) | 1,188 psi (8.19 MPa) | 899 psi (6.20 MPa) | 809 psi (5.58 MPa) | 850 psi (5.86 MPa) |
| Tensile Strength (psi, MPa) | 5,077 psi (35.01 MPa) | 5,384 psi (37.12 MPa) | 4,634 psi (31.95 MPa) | 5,348 psi (36.87 MPa) |
| Elongation at Yield (%) | 10.8 | 6.2 | 6.0 | 6.9 |
| Elongation at Break (%) | 688 | 716 | 686 | 740 |
| Elmendorf Tear | | | | |
| MD (g) | 1,058 | 1,188 | 1,127 | 1,569 |
| TD (g) | 1,737 | 1,862 | 1,648 | 2,333 |
| MD (g/mil) | 268 | 308 | 291 | 414 |
| TD (g/mil) | 438 | 485 | 417 | 597 |
| Optical Properties | | | | |
| Haze (%) | 18.8 | 20.1 | 21.7 | 21.7 |
| Gloss - MD | 48.4 | 43.3 | 48.7 | 44.3 |
| Gloss - TD | 46.9 | 43.3 | 46.7 | 45.2 |
| Puncture - A | | | | |
| Peak Load (lbs) | 16.34 | 21.40 | 18.23 | 14.59 |
| Peak/mil (lbs/mil) | 4.16 | 5.57 | 4.70 | 3.78 |
| Break Energy (in-lbs) | 26.31 | 51.29 | 43.01 | 29.55 |
| Break Energy/mil (in-lbs/mil) | 6.69 | 13.36 | 11.08 | 7.66 |
| Holding Force (N) - End Force | 24 | 23 | 24 | 21 |

Example 2 films F, G, and H, which contained the FPC and the SPC in the core layer, exhibited improved Elemendorf tear in the MD as compared to Film E which contained only the SPC in the core layer. Films F, G, and H also exhibited an increased break energy as compared to Film E.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A method for packaging an article with a stretch hood film comprising:
    a. providing a tubular film sealed on one end, wherein the film is a multi-layer film comprising a core layer and skin layers, wherein the skin layers are arranged on each side of the core layer, wherein the core layer comprises:

i. 20 to 90 wt % of a first polymer component (FPC), wherein the FPC has a melt flow rate in the range of 0.5 to 50 dg/min, a heat of fusion of less than 75 J/g and comprises:
1. 65 to 95 wt % of propylene-derived units based upon total weight of the FPC; and
2. 3 to 35 wt % of at least one of ethylene-derived units and $C_4$ to $C_{20}$ alpha-olefins or mixtures thereof, based upon total weight of the FPC; and ii. 80 to 10 wt % of a second polymer component (SPC), wherein the SPC comprises ethylene-derived units and 1 to 30 wt % of units derived from a co-polymerizable ethylenically unsaturated ester, based on the total weight of the SPC, the SPC having:
1. a melt index in the range of from 0.05 to 20 g/10 min;
2. a density in the range of 0.90 to 0.94 g/cm³; and
3. at least 10 per 1000 C-atoms of $C_1$ to $C_5$ short chain branches;

wherein the wt % of the FPC and the wt % of the SPC are based upon the combined total weight of the FPC and SPC, and at least one skin layer comprises at least 60 wt % of a linear low density polyethylene having a density in the range of 0.92 to 0.951 g/cm³; and wherein the film has an elastic recovery after a 100% stretch of at least 40% and provides a normalized holding force per 100 µm thickness pre-stretch at 85% stretch of at least 17 N/50 mm, after an initial stretch of 100%;

b. stretching the film with a stretcher in the transverse direction beyond the external dimensions of the article;

c. stretching the film with the stretcher in the machine direction;

d. pulling the film downwards over the article; and e. releasing the film from the stretcher, wherein the film's elastic recovery acts to form a stretch hood around the article.

2. A film comprising at least one layer, the layer comprising:
a. 20 to 90 wt % of a first polymer component (FPC), wherein the FPC has a melt flow rate in the range of 0.5 to 50 dg/min, a heat of fusion of less than 75 J/g and comprises:
   i. 65 to 96 wt % of propylene-derived units, based upon the total weight of the FPC; and
   ii. 3 to 35 wt % of at least one of ethylene-derived units or units derived from a $C_4$ to $C_{20}$ alpha-olefin, or mixtures thereof, based upon the total weight of the FPC; and
b. 80 to 10 wt % of a second polymer component (SPC), wherein the SPC comprises ethylene-derived units and 1 to 30 wt % of units derived from a co-polymerizable ethylenically unsaturated ester based on the weight of the SPC, the SPC having:
   i. a melt index in the range of from 0.05 to 20 g/10 min;
   ii. a density in the range of 0.92 to 0.951 g/cm³; and
   iii. at least 10 per 1000 C-atoms of $C_1$ to $C_5$ short chain branches;

wherein the wt % of the FPC and the wt % of the SPC are based upon the combined total weight of the FPC and SPC, and the film has an elastic recovery after a 100% stretch of at least 40% and provides a normalized holding force per 100 µm thickness pre-stretch at 85% stretch of at least 17 N/50 mm, after an initial stretch of 100%.

3. The film of claim 1, wherein the FPC comprises:
   i. 80 to 96 wt % of propylene-derived units, based upon total weight of the FPC; and
   ii. 4 to 20 wt % of at least one of ethylene-derived units or a $C_4$ to $C_{20}$ alpha-olefin, or mixtures thereof, based upon total weight of the FPC.

4. The film of claim 1, wherein the FPC consists essentially of propylene and ethylene.

5. The film of claim 1, wherein the SPC comprises units derived from ethylene vinyl acetate copolymer.

6. The film of claim 1, wherein the film is made by blown film extrusion in tubular form adapted to form a stretch hood upon stretching in the machine and transverse directions.

7. A multi-layer film comprising a core layer and skin layers, wherein the skin layers are arranged on each side of the core layer, wherein the core layer comprises:
   a. 20 to 90 wt % of a first polymer component (FPC), wherein the FPC has a melt flow rate in the range of 0.5 to 50 dg/min, a heat of fusion of less than 75 J/g and comprises:
      i. 65 to 95 wt % of propylene-derived units, based upon total weight of the FPC; and
      ii. 3 to 35 wt % of at least one of ethylene-derived units or a $C_4$ to $C_{20}$ alpha-olefin or mixtures thereof, based upon total weight of the FPC; and
   b. 80 to 10 wt % of a second polymer component (SPC), wherein the SPC comprises ethylene-derived units and 1 to 20 wt % of units derived from a co-polymerizable ethylenically unsaturated ester based on the weight of the SPC based upon total weight of the SPC, and the SPC having:
      i. a melt index in the range of from 0.05 to 20 g/10 min; and
      ii. a density in the range of 0.90 to 0.94 g/cm³;
   wherein the wt % of the FPC and wt % of the SPC are based upon the combined total weight of the FPC and SPC, and the skin layers comprise at least 60 wt % of a linear low density polyethylene having a density in the range of 0.91 to 0.94 g/cm³.

8. The multi-layer film of claim 7, wherein the FPC comprises:
   i. 80 to 93 wt % of propylene-derived units, based upon total weight of the FPC; and
   ii. 7 to 20 wt % of at least one of ethylene-derived units and a $C_4$ to $C_{20}$ alpha-olefin or mixtures thereof, based upon total weight of the FPC.

9. The multi-layer film of claim 7, wherein the FPC consists essentially of propylene-derived units and ethylene-derived units.

10. The multi-layer film of claim 7, wherein the SPC has a rheological relaxation time of at least 10 seconds.

11. The multi-layer film of claim 7, wherein the SPC comprises 1 to 10 wt % of units derived from a co-polymerizable ethylenically unsaturated ester, based upon total weight of the SPC.

12. The multi-layer film of claim 7, wherein the SPC comprises ethylene vinyl acetate copolymer.

13. The multi-layer film of claim 7, wherein the SPC has at least 10 per 1000 C-atoms of $C_1$ to $C_5$ short chain branches.

14. The multi-layer film of claim 7, wherein one or more of the skin layers contain less than 7500 ppm of antiblock particulates.

15. The multi-layer film of claim 7, wherein the film has an elastic recovery after a 100% stretch of at least 40% and provides a normalized holding force per 100 µm thickness pre-stretch at 85% stretch of at least 17 N/50 mm, after an initial stretch of 100%.

16. The multi-layer film of claim 7, wherein the film has an elastic recovery after a 100% stretch of at least 50% and provides a normalized holding force per 100 μm thickness pre-stretch at 85% stretch of at least 20 N/50 mm, after an initial stretch of 100%.

17. The multi-layer film of claim 7, which is made by blown film extrusion in tubular form adapted to form a stretch hood upon stretching in the machine and transverse directions.

18. The multi-layer film of claim 7, wherein the film has an Elmendorf tear strength of at least 15.7 g/μ in the machine direction and at least 18.9 g/μ in the transverse direction.

19. The multi-layer film of claim 7, wherein the film has a secant modulus of less than 130 MPa in both the machine direction and the transverse direction.

20. The multi-layer film of claim 7, wherein the film can be used as stretch hoods for pallets of more than one size.

\* \* \* \* \*